United States Patent
Mariller

(10) Patent No.: US 9,661,948 B2
(45) Date of Patent: May 30, 2017

(54) DEVICE FOR PREPARING A DRINK

(75) Inventor: Alain Mariller, Le Mont-Pélerin (CH)

(73) Assignee: ETHICAL COFFEE COMPANY S.A., Fribourg (CH)

(*) Notice: Subject to any disclaimer, the term of this patent is extended or adjusted under 35 U.S.C. 154(b) by 0 days.

(21) Appl. No.: 13/063,671

(22) PCT Filed: Sep. 11, 2009

(86) PCT No.: PCT/IB2009/053983
§ 371 (c)(1),
(2), (4) Date: Apr. 7, 2011

(87) PCT Pub. No.: WO2010/029512
PCT Pub. Date: Mar. 18, 2010

(65) Prior Publication Data
US 2011/0183055 A1    Jul. 28, 2011

(51) Int. Cl.
*A47J 31/06* (2006.01)
*A47J 31/36* (2006.01)

(52) U.S. Cl.
CPC ....... *A47J 31/0673* (2013.01); *A47J 31/3628* (2013.01); *A47J 31/3695* (2013.01)

(58) Field of Classification Search
CPC .. A47J 31/407; A47J 31/3623; A47J 31/3628; A47J 31/36; A47J 31/0668; A47J 31/3685; A47J 31/3614; A47J 31/0673; A47J 31/3695; A47J 31/3676
See application file for complete search history.

(56) References Cited

U.S. PATENT DOCUMENTS

| | | | |
|---|---|---|---|
| 6,182,554 B1 | 2/2001 | Beaulieu et al. | |
| 6,499,388 B2 * | 12/2002 | Schmed | 99/295 |
| 7,464,636 B2 * | 12/2008 | Mariller | 99/295 |
| 2005/0160919 A1 | 7/2005 | Balkau | |

FOREIGN PATENT DOCUMENTS

| | | | |
|---|---|---|---|
| CN | 101001555 A | 7/2007 | |
| EP | 1 163 869 | 12/2001 | |
| JP | 2002-535021 | 10/2002 | |
| JP | 2005-211659 | 8/2005 | |
| WO | WO 00/42891 | 7/2000 | |
| WO | WO 2006/003115 A1 | 1/2006 | |
| WO | WO 2006003115 A1 * | 1/2006 | A47J 31/06 |
| WO | 2006/013124 | 2/2006 | |

(Continued)

OTHER PUBLICATIONS

English Translation of International Preliminary Report on Patentability (IPRP) for PCT/IB2009/053983, dated Apr. 5, 2011.

(Continued)

*Primary Examiner* — Jill Warden
*Assistant Examiner* — Hong T Yoo
(74) *Attorney, Agent, or Firm* — Nixon & Vanderhye P.C.

(57) ABSTRACT

Device for preparing a drink by extracting a measured quantity, for example of ground coffee, contained in a capsule (1) equipped with an extraction membrane (7), said device comprising a water inlet (5), a capsule holder (2), a capsule cage (3), clamping means and a set of spikes (6) for piercing said membrane (3); characterized in that the clamping means comprise a piston (4) mounted such that it can move with respect to the cage (3).

8 Claims, 4 Drawing Sheets

(56) References Cited

FOREIGN PATENT DOCUMENTS

Figure 1:
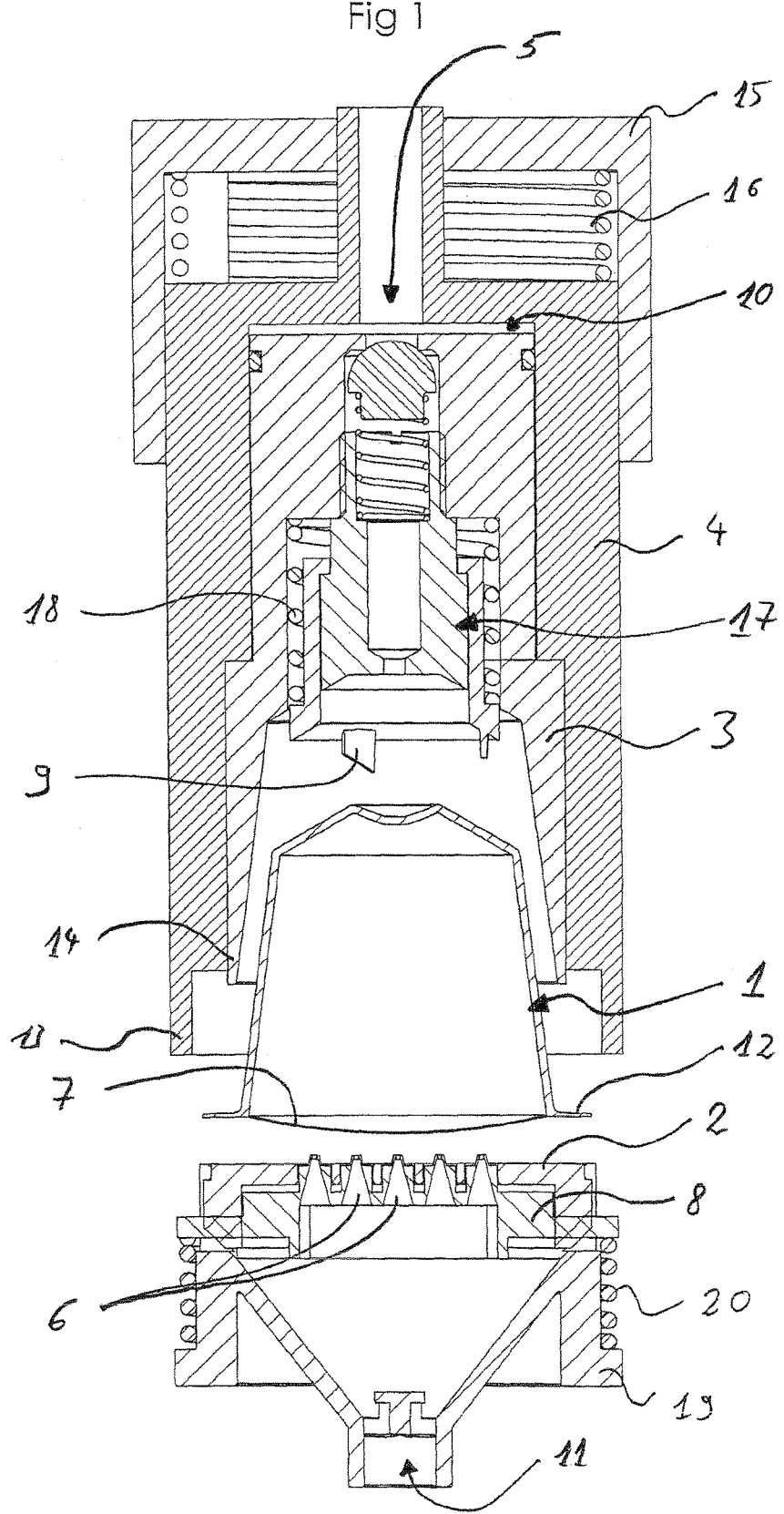

| WO | WO 2008/046740 A1 | 4/2008 |
|---|---|---|
| WO | 2008/096385 | 8/2008 |
| WO | WO 2008/096385 A8 | 8/2008 |

OTHER PUBLICATIONS

International Search Report for PCT/IB2009/053983, mailed Feb. 1, 2010.
Written Opinion of the International Searching Authority for PCT/IB2009/053983, mailed Feb. 1, 2010.
Chinese Office Action dated Oct. 12, 2012 and its English translation.
Japanese Office Action mailed Aug. 13, 2013, and its English translation for Japanese Patent Application No. 2011-526616 that corresponds to Applicant's PCT/IB2009/053983, filed on Sep. 11, 2009.

* cited by examiner

DEVICE FOR PREPARING A DRINK

This application is the U.S. national phase of International Application No. PCT/IB2009/053983, filed 11 Sep. 2009, which designated the U.S. and claims priority to International Application No. PCT/IB2008/053717, filed 13 Sep. 2008, the entire contents of each of which are hereby incorporated by reference.

FIELD OF THE INVENTION

The present invention lies in the field of devices for preparing drinks by extracting a serving, for example of ground coffee, contained in a cartridge.

PRIOR ART

Devices that operate according to the abovementioned principle have existed for many decades.

U.S. Pat. Nos. 2,899,886, 2,968,560, 3,403,617 and 3,607,297 describe devices in which the cartridge is initially perforated at a number of locations and then pressurized water is passed through it.

the cartridge described in patent CH 605 293 or in patent EP 0 242 556 B1 comprises a membrane in its lower part. Pressurized water is initially introduced into the upper part of the cartridge, thereby causing the cartridge to swell, mainly at the membrane. Beyond a certain pressure, the membrane tears, and thus enables a mixture of water and coffee to flow out.

In the device presented in patent EP 0 512 470 B1, by bulging following the introduction of water into the cartridge, the membrane is squashed and perforated against a surface which comprises elements in relief.

Other devices that make use of a mode of operation identical or similar to those described above are presented in the following patents: EP 0 250 810 B1, EP 0 521 188 B1, EP 0 521 397 B1, EP 0 726 053 B1, EP 0 469 162 B1 and WO 92/07775.

Also known are devices where the mixture of water and coffee is first of all produced in the chamber containing the cartridge, but only starts to flow out when the pressure in the chamber containing the cartridge reaches a predefined minimum value. See in particular patent applications EP 0 726 053 A1, EP 0 622 039 A1 and EP 1 016 364 A2.

SUMMARY OF THE INVENTION

The present invention constitutes an improvement over the devices of the prior art. It consists in particular of a mechanism and a method for piercing the cartridge membrane in a progressive and efficient manner.

To this end, the invention relates firstly to a device for preparing a drink by extracting a serving, for example of ground coffee, contained in a cartridge equipped with an extraction membrane, said device including a water inlet, a cartridge holder, a cartridge cage, clamping means and a set of spikes intended to pierce said membrane, characterized in that the clamping means include a piston mounted in a movable manner with respect to the cage.

According to a first embodiment of the invention, the spikes are mounted in a movable manner in relation to the cartridge holder.

Advantageously, the device includes a mechanism for securing the movable spikes to the piston.

According to another embodiment of the invention, the cartridge cage comprises a cartridge-ejecting component.

In another variant of the invention, the ejecting component has no cartridge piercing elements.

The use of the device according to the invention includes the following successive steps:
a cartridge is introduced into the cartridge cage;
the assembly formed by the cartridge holder, the cartridge cage and the clamping piston is lowered;
said assembly is clamped and the movable spikes are retracted into the inside of the cartridge holder; and
pressurized water is introduced into the cartridge, the piston is moved and the spikes are driven through the cartridge holder and the membrane.

DETAILED DESCRIPTION OF THE INVENTION

The invention is described in more detail hereinbelow by means of examples illustrated in the following figures:

FIG. 1 describes an embodiment of a device according to the invention during the introduction of a cartridge.

Figure 2:
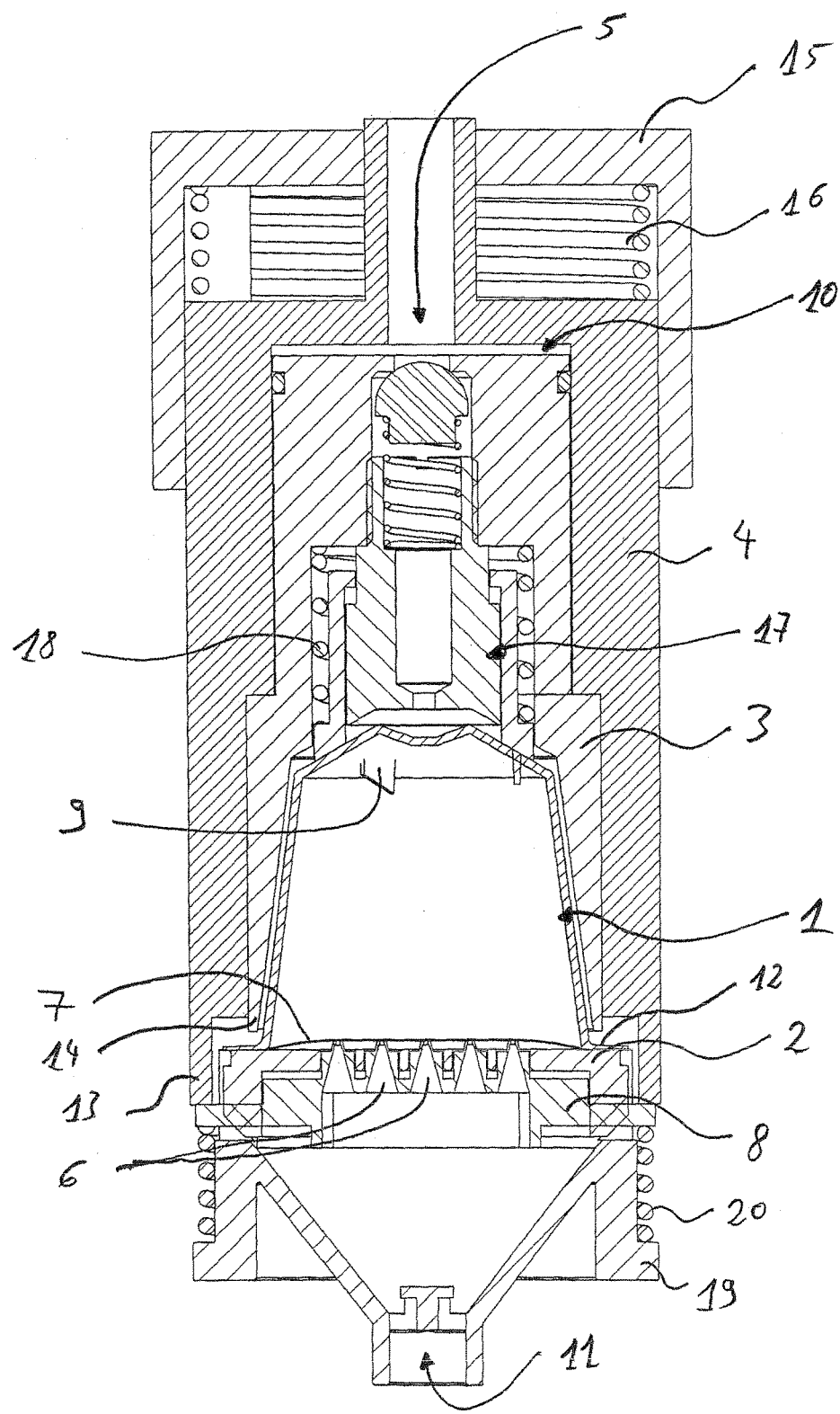

FIG. 2 describes the device from FIG. 1 at rest, after the cartridge holder and cartridge cage assembly has been closed.

Figure 3:
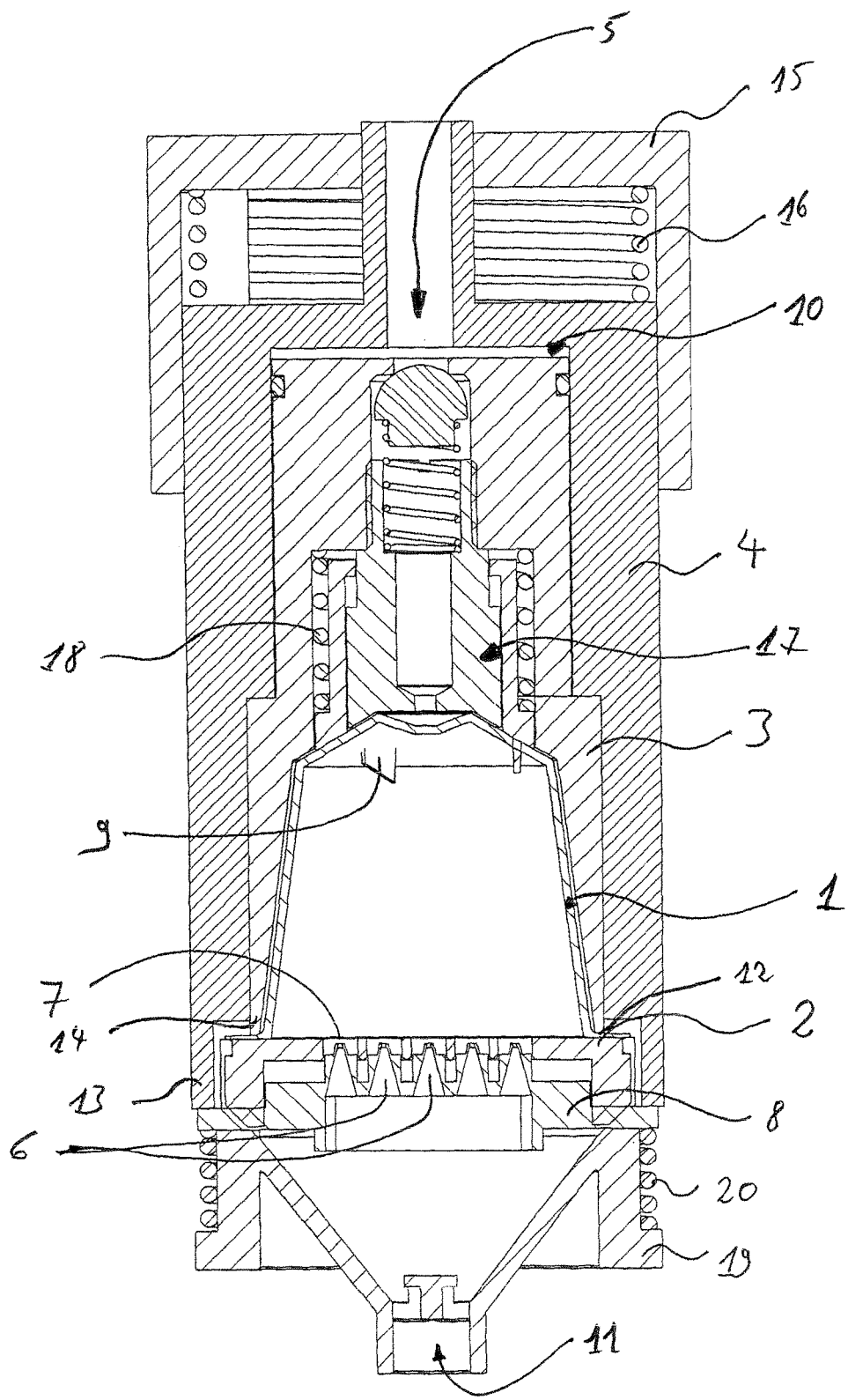

FIG. 3 describes the device from FIG. 1 after the cartridge holder and cartridge cage assembly has been clamped.

Figure 4:
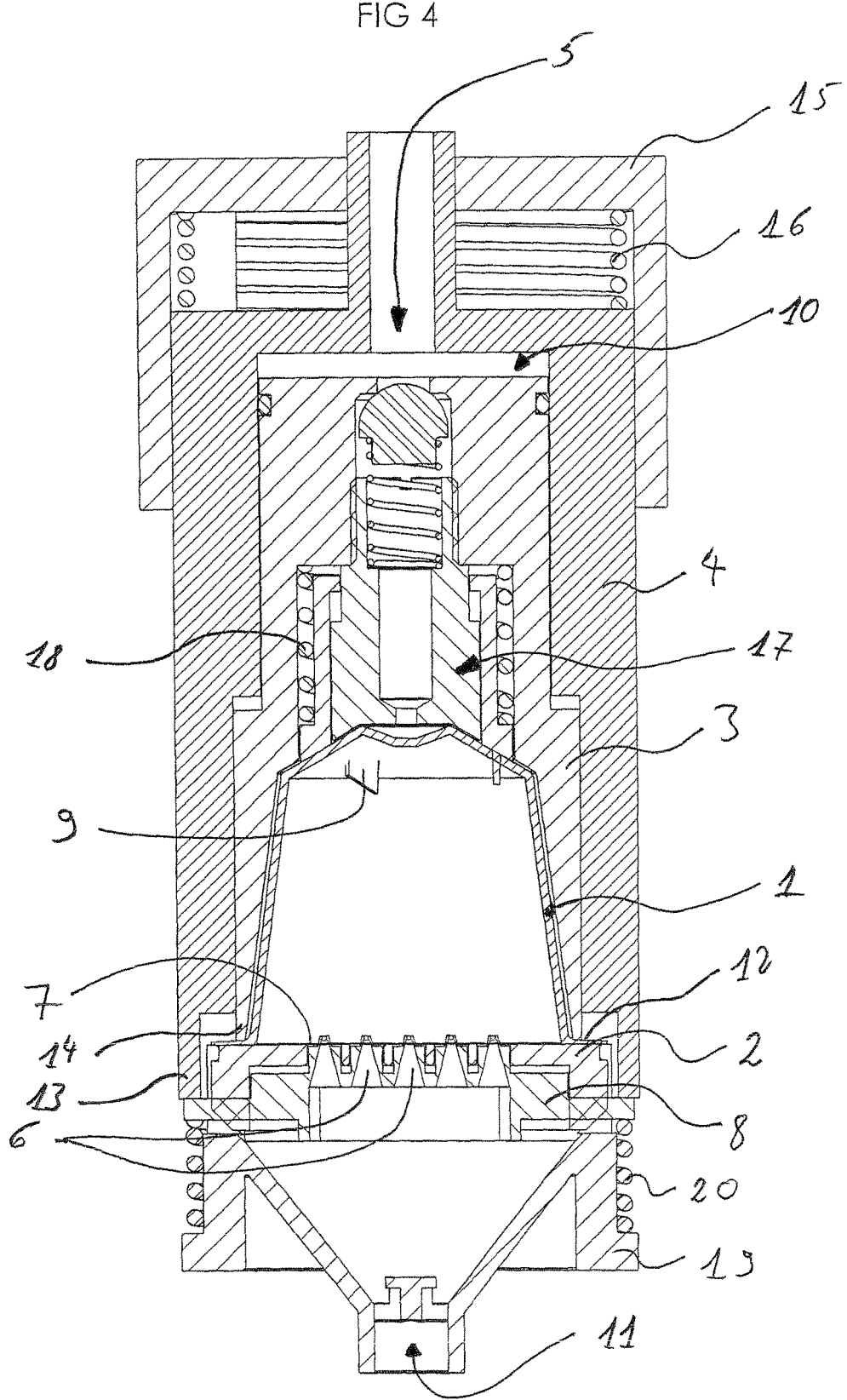

FIG. 4 illustrates the device from FIG. 1 in the active position when water is passing through the device.

LIST OF REFERENCE NUMBERS IN THE FIGURES

1. Cartridge
2. Cartridge holder
3. Cartridge cage
4. Clamping piston
5. Water inlet
6. Spikes
7. Extraction membrane
8. Spike support
9. Spike
10. Expansion space
11. Drink outlet
12. Flange
13. Lower end of the clamping piston
14. Lower end of the cartridge cage
15. Upper unit
16. Upper spring
17. Cartridge ejection part
18. Ejection spring
19. Lower unit
20. Lower spring The device illustrated in FIGS. 1 to 4 includes a cartridge cage 3 comprising in its upper part a water inlet 5 which is connected to a water tank (not illustrated) and to a pump (not illustrated). The cartridge cage 3 is furthermore fastened to an upper unit 15 of the device.

The device also includes a clamping piston 4 mounted in a sliding manner with respect to the assembly formed by the cartridge cage 3 and the upper unit 15, an upper spring 16 being located in the space formed between the inner wall of the upper unit 15 and the upper face of the clamping piston 4. The inside of the cage 3 comprises a space intended to hold a cartridge 1 having a flexible membrane 7 in its lower part. The lower part 14 of the cage 3 is designed to come into contact with the flange 12 of the cartridge 1. An ejection part 17 is located in the upper part of the cage 3 and mounted in a sliding manner with respect to the latter. The lower part of the ejection part 17 comprises spikes 9 intended to pierce the upper face of the cartridge 1. An expansion space 10 is formed between the outer upper face of the cage 3 and the inner upper wall of the clamping piston 4. The variation in the expansion space 10 will be discussed later in the text.

A cartridge holder 2 formed mainly of a perforated horizontal plate is located in the lower part of the device. A set of spikes 6 that are fixed to a support 8 located under the cartridge holder 2 is mounted in a movable manner in relation to the cartridge holder 2 through the perforations in the latter.

The device functions as follows:

A cartridge 1 is initially introduced into the cage 3 (FIG. 1).

The assembly consisting of the upper unit 15, the clamping piston 4 and the cage 3 is then lowered and reaches an intermediate position (FIG. 2) which is characterized by contact between the lower end 13 of the clamping piston 4 and the spike support 8. It should be noted that at this stage the spikes 6 emerge slightly from the cartridge holder 2 but do not pierce the membrane 7 because the latter has a certain flexibility and, moreover, pressurized water has not yet been introduced into the cartridge 1.

The assembly consisting of the upper unit 15, the clamping piston 4 and the cage 3 continues to be lowered until the device is located in a starting position (FIG. 3). This latter movement has the effect of moving the spike support 8 and the spikes 6 downward, thereby causing the spikes 6 to retract into the cartridge holder 2. At the same time, the lower part 14 of the cage 3 butts against the flange 12 of the cartridge 1, thus ensuring optimal sealing between the cartridge 1 and the inside of the cage 3.

It is noted, furthermore, that in the starting position the ejection part 17 has been retracted into a housing located in the upper part of the cage 3, thereby having the effect of compressing an ejection spring 18 which is located between the ejection part 17 and the inner wall of the housing.

Pressurized water is then introduced into the device (FIG. 4). By filling in particular the expansion space 10, this has the effect of driving the clamping piston 4 upward. At the same time, the water enters the cartridge 1. This results in an increase in pressure inside the latter and the membrane 7 stretches.

The upward movement of the clamping piston 4 also drives the spike support 8 upward.

The spikes 6 emerging through the cartridge holder 2 pierce the membrane 7. The mixture of water with the contents of the cartridge 1 (for example coffee) thus flows out through the drink outlet orifice 11.

Once the extraction operation has been carried out, the assembly consisting of the upper unit 15, the clamping piston 4 and the cage 3 is raised. The ejection spring 18 relaxes, thereby driving the ejection part 17 downward. This movement has the effect of making it easier to eject the capsule 1 from the device.

It goes without saying that the invention is not limited to the device illustrated in FIGS. 1 to 4. It also covers any mechanism as described in the claims.

It will be noted that it is possible for the ejection component 17 to have no spikes.

More generally, it is possible for the device to have no spikes. In this case, the water is introduced into the cartridge by other means, for example via self-piercing reliefs.

The invention claimed is:

1. An extraction device for preparing a drink serving by extracting a beverage ingredient contained in a beverage cartridge which includes a cartridge flange defining an open end of the cartridge and an extraction membrane covering the open end, said device comprising:
    a cartridge holder for holding the beverage cartridge by supporting the cartridge flange thereon,
    a spike support which includes a set of spikes fixed to the spike support and adapted to pierce the extraction membrane, the spike support is being moveably mounted with respect to the cartridge holder such that the set of spikes are opposed to the extraction membrane and are moveable between a starting position and an extraction position, the spike support being adapted to retract relative to the cartridge holder such that the set of spikes is spaced from the extraction membrane when in the starting position, and adapted to extend to the cartridge holder such that the set of spikes pierces the extraction membrane when in the extraction position,
    a cartridge cage which defines a cartridge space for accommodating the beverage cartridge, the cartridge cage including a lower engagement end adapted to engage the cartridge flange to positionally hold the cartridge flange against the cartridge holder,
    a clamping device which surrounds the cartridge cage, the clamping device including an upper unit and a clamping piston moveably mounted with respect to the upper unit and the cartridge cage, wherein
    the clamping device and the cartridge cage are mounted to be moveable relative to one another in a closed position of the extraction device when the clamping device is clamped onto the spike support, and wherein
    the cartridge cage is moveably mounted relative to the upper unit of the clamping device to move between an initial position with the lower engagement end spaced from the cartridge flange and an engaged position with the lower engagement end engaged with the cartridge flange, and wherein
    an expansion space for receiving pressurized water defined between an outer upper face of the cartridge cage and an inner upper wall of the clamping piston which opposes the outer upper face of the cartridge cage, the expansion space has a volume which increases when pressurized water is introduced therein, wherein
    the clamping piston includes a lower clamp end which contacts the spike support and is adapted to move the spike support into the starting position in absence of the pressurized water in the expansion space, and wherein
    the clamping piston is configured to move relative to the cartridge cage in the presence of pressurized water introduced into the expansion space from the starting position to the extraction position and the spike support is configured to move respectively in response to movement of the clamping piston from the starting position to the extraction position from the initial position to the extraction position thereof such that the set of spikes pierces the extraction membrane to allow extraction of the beverage ingredient.

2. The extraction device according to claim 1, in which the cartridge cage comprises a cartridge-ejecting component.

3. The extraction device according to claim 2, wherein the cartridge ejecting component has no cartridge piercing elements.

4. A method of using an extraction device according to claim 1, wherein the method comprises the following successive steps:
    (a) introducing the cartridge into the cartridge cage;

(b) lowering the cartridge cage and the piston to cause the piston to directly contact the spike support such that the spike support and the set of spikes move downward, and the spikes are caused to retract into the cartridge holder; and (c) introducing pressurized water into the expansion space and into the cartridge such that the piston and the spike support move upward, and the spikes emerging through the cartridge holder are caused to pierce the extraction membrane.

5. The extraction device according to claim 1, wherein the serving is ground coffee.

6. The extraction device according to claim 1, wherein the cartridge cage has a cylindrical outer wall, and the clamping piston has a corresponding cylindrical inner wall, the cylindrical outer wall of the cartridge cage and the cylindrical inner wall of the clamping piston configured to provide a sliding surface for the relative movement between the cartridge cage and the clamping piston.

7. An extraction device for preparing a drink by extracting a serving of an ingredient contained in a cartridge equipped with an extraction membrane, wherein the device comprises:
a water inlet,
a cartridge holder,
a cartridge cage,
a clamping device surrounding the cartridge cage,
an expansion space for receiving pressurized water defined between an outer upper face of the cartridge cage and an inner upper wall of the clamping piston which opposes the outer upper face of the cartridge cage, the expansion space has a volume which increases when pressurized water is introduced therein, and
a spike support supporting a set of spikes intended to pierce the membrane of the cartridge, wherein
the clamping device is configured to be clamped onto the spike support, and wherein
the cartridge cage is configured to be axially translated between a first position where the membrane is not pierced by the spikes and a second position where the membrane is pierced by the spikes, the cartridge cage being axially translated inside the clamping device while the claiming device is clamped onto the spike support to close the clamping device.

8. The extraction device according to claim 7, wherein the set of spikes traverse the cartridge holder during axial translation of the cartridge cage between the first and second positions.

* * * * *